(12) United States Patent
Davis

(10) Patent No.: US 6,966,613 B2
(45) Date of Patent: Nov. 22, 2005

(54) INTEGRATED PASSENGER VEHICLE TRAILER BRAKE CONTROLLER

(75) Inventor: Scott William Davis, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 369 days.

(21) Appl. No.: 10/064,682

(22) Filed: Aug. 6, 2002

(65) Prior Publication Data

US 2004/0026987 A1 Feb. 12, 2004

(51) Int. Cl.[7] ............................................ B60T 13/00
(52) U.S. Cl. .................. 303/7; 303/3; 303/20
(58) Field of Search ................ 303/7, 20, 123, 303/124, 3

(56) References Cited

U.S. PATENT DOCUMENTS

| 4,295,687 | A | * | 10/1981 | Becker et al. ................ 303/20 |
| 5,002,343 | A |   | 3/1991  | Brearley et al. |
| 5,438,516 | A |   | 8/1995  | Neubauer et al. |
| 5,549,364 | A | * | 8/1996  | Mayr-Frohlich et al. .... 303/123 |
| 5,620,236 | A | * | 4/1997  | McGrath et al. .............. 303/20 |
| 5,782,542 | A |   | 7/1998  | McGrath et al. |
| 5,800,025 | A |   | 9/1998  | McGrath et al. |
| 6,039,410 | A |   | 3/2000  | Robertson et al. |
| 6,068,352 | A |   | 5/2000  | Kulkarni et al. |
| 6,139,118 | A |   | 10/2000 | Hurst et al. |
| 6,179,390 | B1 |  | 1/2001  | Guzorek et al. |

* cited by examiner

*Primary Examiner*—Thomas J. Williams
(74) *Attorney, Agent, or Firm*—Artz & Artz, P.C.; Fredrick Owens

(57) ABSTRACT

A trailer brake controller 10 for use in a passenger vehicle 12 is provided, including a control element 11 positioned within the passenger vehicle 12, a vehicle speed input 16 and a vehicle brake pressure input 14 providing speed and brake pressure data to the control element 11, and a trailer brake output 18 sending a signal to the trailer in response to the vehicle speed input 16 and the vehicle brake pressure input 14.

16 Claims, 2 Drawing Sheets

INTEGRATED PASSENGER VEHICLE TRAILER BRAKE CONTROLLER

BACKGROUND OF INVENTION

The present invention relates generally to a passenger vehicle brake controller and more particularly to a passenger vehicle trailer brake controller.

The design of passenger vehicles is often driven by a variety of factors. Two prevalent features are often the need for increased utility and the need for increased safety. Consumer convenience also can play a significant role. One area in which all such design factors must be considered is often a passenger vehicle's ability to transport objects. Passenger vehicle transport capabilities is an important design aspect of modern vehicles. The ability to haul objects and equipment is often as important as the vehicle's ability to transport additional passengers. Solutions aimed at increasing a vehicle's hauling capabilities must not only be directed at improving the vehicle's utility but must also be directed towards improving a vehicle's safety and performance while accomplishing this task. One traditional approach towards improving a vehicle's transport capabilities has been through the addition of a trailer attached to the vehicle. Trailers allow for a wide range of items to be transported by a vehicle, often without impacting transport capabilities of the vehicle's passenger compartment.

When a trailer's size and transport weight capabilities remain small in relation to the towing vehicle, impact on the towing vehicle's performance and safety is minimized. When the size and weight capacity, however, are increased, it is known that the trailer can impact the performance of the towing vehicle. Many states, in fact, impose restrictions on trailer design based on towing capacity. One such restriction requires the use of an independent braking controller to actuate the trailer's brakes. This allows the trailer's brakes to provide independent braking power to facilitate stopping of the vehicle/trailer combination.

A wide variety of trailer brake controllers are well known in the prior art. These controllers are commonly sold through after-market channels independent of the passenger vehicle. These after-market trailer brake controllers must therefore be designed to accommodate a wide variety of towing vehicles and trailer assemblies. Thus, the specific braking characteristics of a given passenger vehicle, a given trailer, or a given passenger vehicle/trailer combination are often not designed into these after-market brake controllers. In addition, intercommunication between the vehicle braking system and the trailer braking system is often minimal. Due to the wide variety of passenger vehicles capable of towing trailers, the simplistic approaches towards trailer brake controlling are often undesirable. In addition, these prior art approaches often leave the determination of a suitable brake controller to the vehicle consumer or after-market technician rather than relying on the preferable knowledge of the vehicle designers to determine suitability. It would, therefore, be highly desirable to have a trailer brake controller integrated into the passenger vehicle prior to the vehicle's sale such that proper braking performance could be predetermined and advanced braking procedures could be implemented.

Commercial truck/rig designs have long realized the benefit of integrating trailer brake control with the semi-cab braking. The mere proportions and travel weight of commercial cab/trailers dictates that the trailers must play a significant role in braking. In addition, significant development has been achieved in the interaction between cab and trailer braking in these commercial embodiments. Yet, despite over two decades of popularity for large passenger vehicles such as SUV's, minivans, vans, and pickup trucks, the developments within the commercial sector have not always translated into approved passenger vehicle/trailer braking.

One significant difference between commercial and passenger vehicle braking systems is that commercial systems often utilize the trailer as the primary braking component of the vehicle. In passenger systems, however, the passenger vehicle itself usually remains the primary braking component. Despite this fact, it is still highly desirable to have an improved coordination between trailer and co-vehicle braking systems within the passenger vehicle design. It would further be highly desirable to utilize concepts developed for commercial trucking scenarios, and adopt and adjust them to better suit passenger vehicle towing scenarios.

SUMMARY OF INVENTION

It is, therefore, an object of the present invention to provide a passenger vehicle braking system with an integrated trailer brake controller. It is a further object of the present invention to provide a passenger vehicle braking system with improved cooperation between vehicle and trailer braking.

In accordance with the objects of the present invention, a trailer brake controller is provided. The trailer brake controller is incorporated into the braking equipment of a passenger vehicle in order to provide a braking command signal to a trailer towed by the passenger vehicle. The trailer brake controller includes a controller element having a vehicle speed input and a vehicle brake pressure input. The trailer brake controller tailors the command signal to accommodate different vehicle speed inputs and vehicle brake pressure inputs.

Other objects and features of the present invention will become apparent when viewed in light of the detailed description of the preferred embodiment when taken in conjunction with the attached drawings and appended claims.

DETAILED DESCRIPTION

Figure 1:
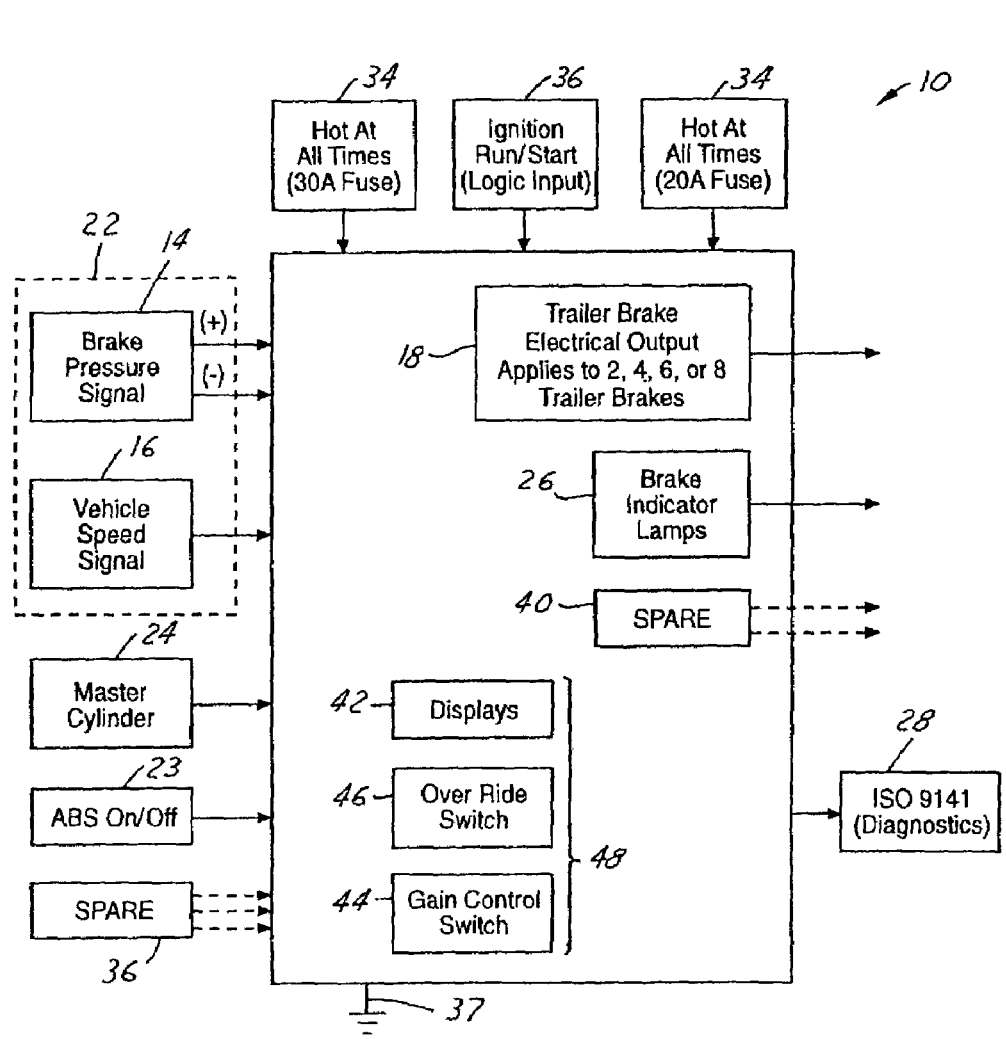
FIG. 1 is a block diagram of an embodiment of a trailer brake controller in accordance with the present invention.

Referring now to FIG. 1, which is an illustration of a trailer brake controller 10 in accordance with the present invention. The trailer brake controller 10 is intended for integration into a passenger vehicle braking system. It is further intended that the trailer brake controller 10 be designed, assembled, and sold with the passenger vehicle such that its control characteristics can be properly set by the vehicle manufacturer for a specific passenger vehicle. Additionally, by integrating the trailer brake controller 10 into the passenger vehicle through manufacture, assembly and distribution, control and display features for the trailer brake controller 10 may be professionally integrated into the passenger vehicle 12 design. Thus, appearance, performance, safety, and customer convenience may be improved.

The trailer brake controller 10 utilizes control element 11, such as a microprocessor, having a brake pressure input 14 and a vehicle speed input 16, in order to adjust the trailer brake output 18. It is contemplated that the inputs from the brake pressure and vehicle speed 14, 16 may be utilized to adjust trailer brake output 18 in a variety of fashions. For example, when the brake pressure input 14 experiences general ramp-up in brake pressure, a similar gradual ramp-up may be applied to the trailer brake output 18. When a sudden market increase in brake pressure input 14 is experienced, however, a step function may be applied to the trailer brake output 18 or to quickly and efficiently apply braking pressure to the trailer. In addition, the vehicle speed input 16 may be used to adjust the trailer brake output 18 such that as the speed of the vehicle increases, the level of gain of the trailer brake output 18 may be increased. Although a fairly straightforward braking algorithm has been thus described, it should be understood that a variety of trailer brake outputs 18 may be applied in response to a given brake pressure input 14 and vehicle speed input 16. One advantage of the present invention is that the relationship of the trailer brake output 18 to the brake pressure input 14 and vehicle speed input 16 may be adjusted for the particular vehicle 12 in which the trailer brake controller 10 is mounted.

It is contemplated that the brake pressure input 14 and the vehicle speed input 16 may be supplied by a variety of contacts with the vehicle 12. In one embodiment, however, it is contemplated that the brake pressure input 14 and the vehicle speed input 16 are supplied through a communication between the vehicle antilock brake system 22 and control element 11. It is known that modern antilock brake systems often contain sensors that provide vehicle speed, vehicle acceleration, and vehicle deceleration. By placing the ABS system in communication with the control element 11, the vehicle speed input 16 may be easily provided. In addition, the acceleration information from the ABS system 22 can be utilized to determine a brake pressure input 14. Finally, an ABS activation input 23 may be utilized to communicate to the control element 11 when the ABS braking system 22 has been activated. This can allow the trailer brake controller 10 to tailor the trailer brake output 18 such that the trailer brakes work in cooperation with the vehicle ABS system 22. It should be understood that although the ABS system 22 may be utilized to supply both the brake pressure input 14 and the vehicle speed input 16, in alternate embodiments, the brake pressure input 14 may be supplied through a variety of known devices or sensors such as vehicle master cylinder sensor 24. Again, although specific embodiments have been described that provide a brake pressure input 14 and a vehicle speed input 16, a variety of methods of obtaining these inputs would be obvious to one skilled in the art.

It is intended that the trailer brake output 18 be capable of controlling a plurality of trailer brakes. Although a variety of trailer brake outputs 18 are contemplated by the present invention, one embodiment contemplates the trailer brake output 18 taking the form of an electrical output. In addition, the trailer brake controller 10 may include a variety of additional components to increase its functionality and performance. A brake indicator lamp output 26 may be used in conjunction with the trailer brake output 18 to improve the safety and performance of the trailer brake controller 10. Similarly, a diagnostic input/output 28 may be included such that the trailer brake controller 10 may communicate with a trailer system 30 to verify the proper operation and functionality of the trailer 30. This diagnostic input 28 not only allows the trailer brake controller 10 to inform a vehicle operator of improper connections, but may also be utilized to help inform the vehicle operator of damage or improper operation of the trailer's braking system. Power supplies 34, ignition run/start inputs 36, grounds 37, and spare inputs 38 and outputs 40 may be utilized to provide basic functionality, concepts well known in the art.

Figure 2:
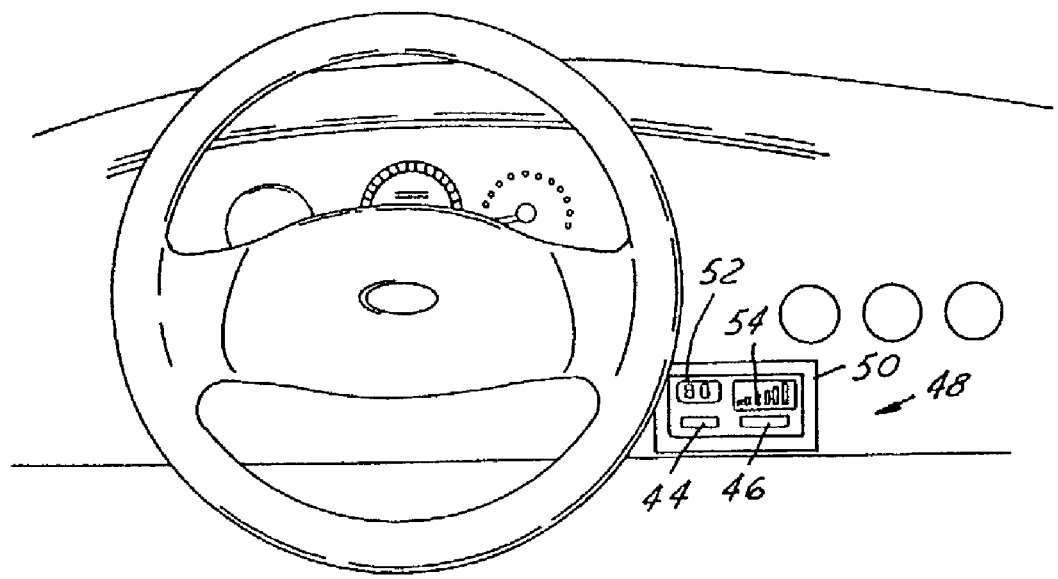
FIG. 2 is an illustration of an automotive dash assembly illustrating an embodiment of communication elements intended for use with the present invention.
Figure 3:
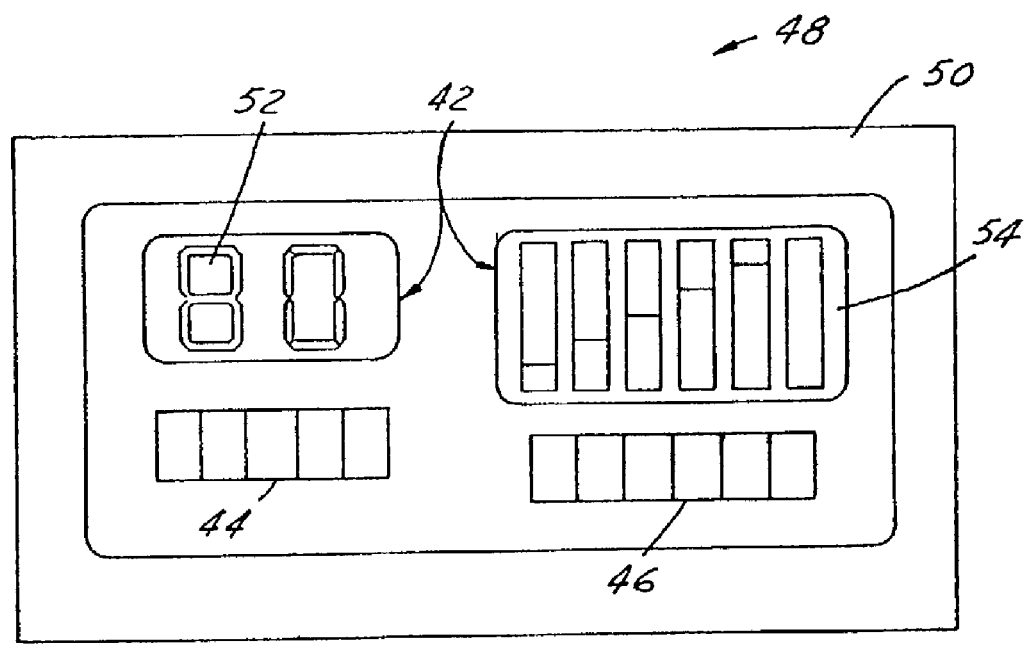
FIG. 3 is a detail of the communication elements illustrated in FIG. 2, the communication elements are intended for use with a trailer brake controller in accordance with the present invention.

It is further contemplated that the trailer brake controller 10 may further provide communication between the control element 11 and the owner/operator. Although this communication can take on a variety of forms, in one embodiment it is contemplated to take the form of a display 42, a user control input 44 (such as a gain input control) and an override switch 46. These communication elements 48 can be adapted and complimented to provide a range of communication and control to the owner/operator. Similarly, although these communication elements 48 may be positioned in numerous locations, one embodiment mounts them to the vehicle dash 50 (see FIGS. 2 and 3). By equipping the vehicle with such a control system during design and manufacture, the appearance of the communication elements 48 can be significantly improved and thereby increase customer satisfaction. The display 42 can include a gain display 52 and a signal strength display 54. The signal strength display 54 allows the owner operator to visualize the trailer brake output 18 signal and adjust the gain input control 44 to suit individual preferences. The override switch 46 can be operated by the owner/operator to apply the trailer brakes independently of the vehicle without braking. It is further contemplated that the display 42 may be utilized to communicate to the owner any improper connections or diagnostic faults determined by the control element 11. This can serve to increase the safety and awareness of the owner by properly apprising them of the status of their trailer's operation.

It should be understood that it is contemplated that the trailer brake controller 10 may include a variety of additional inputs, outputs, and components in addition to those already described. Similarly, if an communication elements 48 are utilized, it is contemplated that they may include a wide variety of displays and control elements such that the owners/operators control and/or understanding of the trailer brake operation is improved. The fully integrated nature of the trailer brake controller 10 allows for close interaction with other vehicle components consistently and thereby allows the trailer brake output 18 to be closely tailored to the braking response of the vehicle 12.

While particular embodiments of the invention have been shown and described, numerous variations and alternative embodiments will occur to those skilled in the arm. Accordingly, it is intended that the invention be limited only in terms of the appended claims.

What is claimed is:

1. A trailer brake controller for use in a passenger vehicle for controlling a towed trailer comprising;
 a control element positioned within the passenger vehicle and in communication with a vehicle anti-lock braking system;
 a vehicle speed input providing vehicle speed from said vehicle anti-lock braking system to said control element;
 a vehicle brake pressure input providing vehicle brake pressure from said anti-lock braking system to said control element; and a trailer brake output, said trailer brake output controlled by said control element in response to said vehicle speed input and said vehicle brake pressure input.

2. A trailer brake controller as described in claim 1, further comprising:
a diagnostic input in communication with said control element, said diagnostic input verifying proper operation of the towed trailer.

3. A trailer brake controller as described in claim 1, further comprising:
at least one trailer brake indicator lamp output.

4. A trailer brake controller as described in claim 1, further comprising:
an anti-lock braking activation input in communication with said control element, said anti-lock braking activation input signaling said control element when a vehicle anti-lock braking system is activated.

5. A trailer brake controller as described in claim 1, further comprising:
at least one communication element, said at least one communication element providing communication between said control element and a vehicle occupant.

6. A trailer brake controller as described in claim 5, wherein said at least one communication element comprises a display.

7. A trailer brake controller as described in claim 5, wherein said at least one communication element comprises a display, a user control and a user over-ride switch.

8. A trailer brake controller as described in claim 7 wherein said user control comprises a gain input control.

9. A trailer brake controller as described in claim 6, wherein said display includes a gain display arid a signal strength display.

10. A method of controlling a trailer braking system comprising:
determining vehicle speed and vehicle braking pressure through communication with an anti-lock braking system on the vehicle;
relaying the vehicle speed and vehicle braking pressure to a control element positioned on the vehicle;
using said vehicle speed and vehicle braking pressure to determine a trailer brake output signal; and
sending said trailer brake output signal to the trailer braking system.

11. A method as described in claim 10, further comprising:
sending a diagnostic signal from the trailer braking system to said control element;
informing a vehicle occupant of said diagnostic signal through the use of a communication element.

12. A method as described in claim 11, wherein said communication element comprises a display mounted within the vehicle dash.

13. A method as described in claim 10, further comprising:
ramping-up said trailer brake output signal gradually in response to a gradual ramp-up in said vehicle braking pressure; and
applying a step-function to said trailer brake output signal in response to a sudden increase in said vehicle braking pressure.

14. A method as described in claim 10, further comprising:
increase a gain of said trailer brake output signal in response to an increase in said vehicle speed.

15. A trader brake controller as described in claim 1, wherein said control element includes logic adapted to:
gradually ramp-up said trailer brake output in response to a gradual ramp-up of said brake pressure input; and
apply a step-function to said trailer brake output in response to a sudden increase of said brake pressure input.

16. A trailer brake controller as described in claim 1, wherein said control element includes logic adapted to:
increase a gain of said trailer brake output in response to an increase in said vehicle speed input.

* * * * *